(12) United States Patent
Kurata et al.

(10) Patent No.: US 12,437,513 B2
(45) Date of Patent: Oct. 7, 2025

(54) MICROSTRUCTURE EVALUATION SYSTEM AND SAMPLE IMAGE IMAGING METHOD

(71) Applicant: Hitachi High-Tech Corporation, Tokyo (JP)

(72) Inventors: Sayaka Kurata, Tokyo (JP); Ryuichirou Tamochi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 337 days.

(21) Appl. No.: 18/018,923

(22) PCT Filed: May 12, 2021

(86) PCT No.: PCT/JP2021/018024
§ 371 (c)(1),
(2) Date: Jan. 31, 2023

(87) PCT Pub. No.: WO2022/044443
PCT Pub. Date: Mar. 3, 2022

(65) Prior Publication Data
US 2023/0316721 A1 Oct. 5, 2023

(30) Foreign Application Priority Data
Aug. 24, 2020 (JP) ................................ 2020-140923

(51) Int. Cl.
*G06V 10/77* (2022.01)
*G06V 10/60* (2022.01)
(Continued)

(52) U.S. Cl.
CPC .......... *G06V 10/7715* (2022.01); *G06V 10/60* (2022.01); *G06V 10/62* (2022.01); *G06V 10/772* (2022.01)

(58) Field of Classification Search
CPC .... G06V 10/7715; G06V 10/60; G06V 10/62; G06V 10/772; G06V 20/69; G06V 10/82;
(Continued)

(56) References Cited

U.S. PATENT DOCUMENTS 12,099,184 B1 * 9/2024 Perugupalli ............ G02B 21/36
2006/0245636 A1 * 11/2006 Kitamura ............... H01J 37/265
382/149
(Continued)

FOREIGN PATENT DOCUMENTS

CN 102144156 A * 8/2011 ............. G01N 21/93
CN 110517246 A * 11/2019 ........... G06T 7/0002
(Continued)

OTHER PUBLICATIONS

Sikora et al. "An efficient algorithm for extracting the magnitude of the measurement error for fractional dynamics." Phys. Chem. Chem. Phys., 2017, 19, 26566-26581. doi: 10.1039/C7CP04464J (Year: 2017).*

(Continued)

*Primary Examiner* — Emily C Terrell
*Assistant Examiner* — Julia Z. Yao
(74) *Attorney, Agent, or Firm* — Miles & Stockbridge, P.C.

(57) ABSTRACT

A microstructure evaluation system or detecting a fluctuation caused by an imaging device, including a feature data extraction unit configured to extract first feature data from an image captured by an imaging device while changing an observation field of view on a sample; and a fluctuation evaluation unit configured to calculate a long-term fluctuation of the first feature data, return an observation field of view to a position before occurrence of the long-term fluctuation and re-capture an image when the long-term fluctuation exceeds a predetermined criterion, and calculate (Continued)

a difference between the first feature data of the captured image at the position before the occurrence of the long-term fluctuation and the first feature data of the re-captured image. The fluctuation evaluation unit determines that the long-term fluctuation is a fluctuation caused by the imaging device when the difference is equal to or greater than a predetermined threshold.

15 Claims, 10 Drawing Sheets

(51) Int. Cl.
 *G06V 10/62* (2022.01)
 *G06V 10/772* (2022.01)
(58) Field of Classification Search
 CPC .. G06T 1/00; G06T 7/00; G06T 7/001; G06T 2207/30168; G06T 2207/30148; H01J 37/22; H01J 37/28; H01L 22/12; G01N 21/9501; G03F 1/84
 See application file for complete search history.

(56) References Cited

U.S. PATENT DOCUMENTS

| | | | | |
|---|---|---|---|---|
| 2011/0249910 | A1* | 10/2011 | Henderson | G06V 10/993 |
| | | | | 382/278 |
| 2011/0261190 | A1* | 10/2011 | Nakagaki | H01J 37/28 |
| | | | | 348/126 |
| 2014/0219546 | A1* | 8/2014 | Minekawa | G06T 7/0004 |
| | | | | 382/149 |
| 2016/0071688 | A1* | 3/2016 | Goto | H01J 37/28 |
| | | | | 250/440.11 |
| 2016/0366335 | A1* | 12/2016 | Miyata | H04N 23/54 |
| 2017/0352142 | A1* | 12/2017 | Tsuchiya | G06V 10/751 |
| 2019/0095740 | A1* | 3/2019 | Yabe | G03F 1/42 |
| 2019/0287761 | A1 | 9/2019 | Schoenmakers et al. | |
| 2021/0182593 | A1* | 6/2021 | Mitasaki | G06T 7/0002 |

FOREIGN PATENT DOCUMENTS

| | | | | |
|---|---|---|---|---|
| JP | 2006-262173 A | | 9/2006 | |
| JP | 2010092234 A | * | 4/2010 | |
| JP | 2011014303 A | * | 1/2011 | |
| JP | 2019-110120 A | | 7/2019 | |
| WO | WO-2010029976 A1 | * | 3/2010 | ............ G01N 21/93 |

OTHER PUBLICATIONS

Search Report mailed Jun. 29, 2021 in International Application No. PCT/JP2021/018024.
Written Opinion mailed Jun. 29, 2021 in International Application No. PCT/JP2021/018024.

* cited by examiner

[FIG. 1]
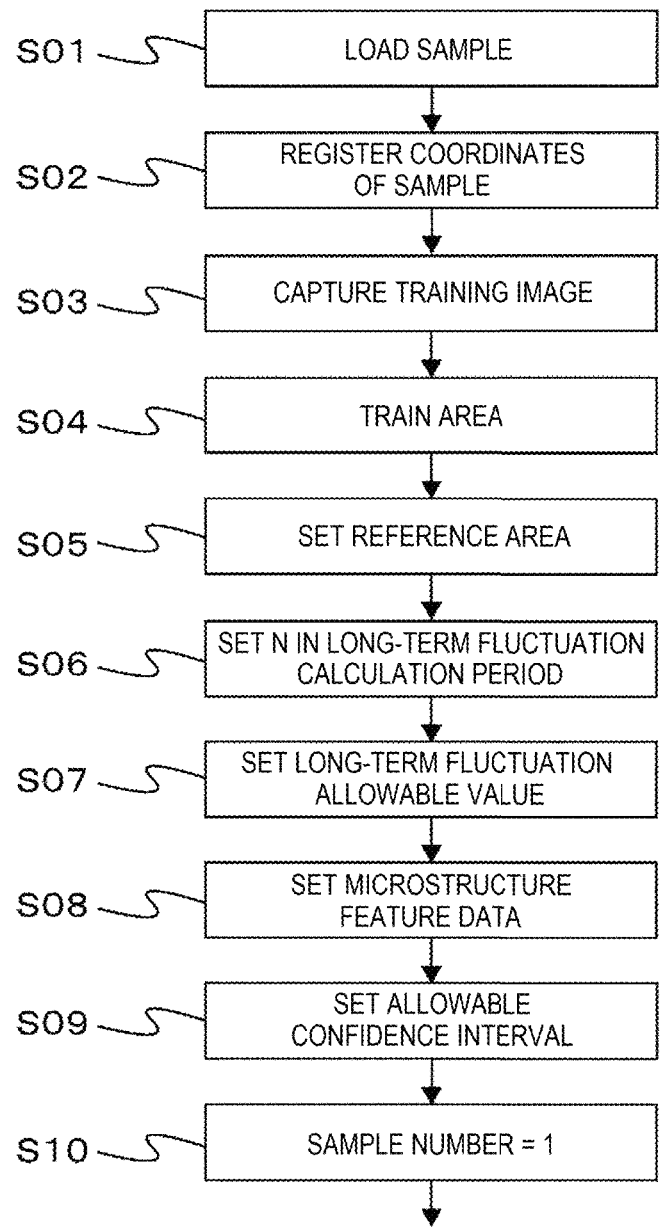

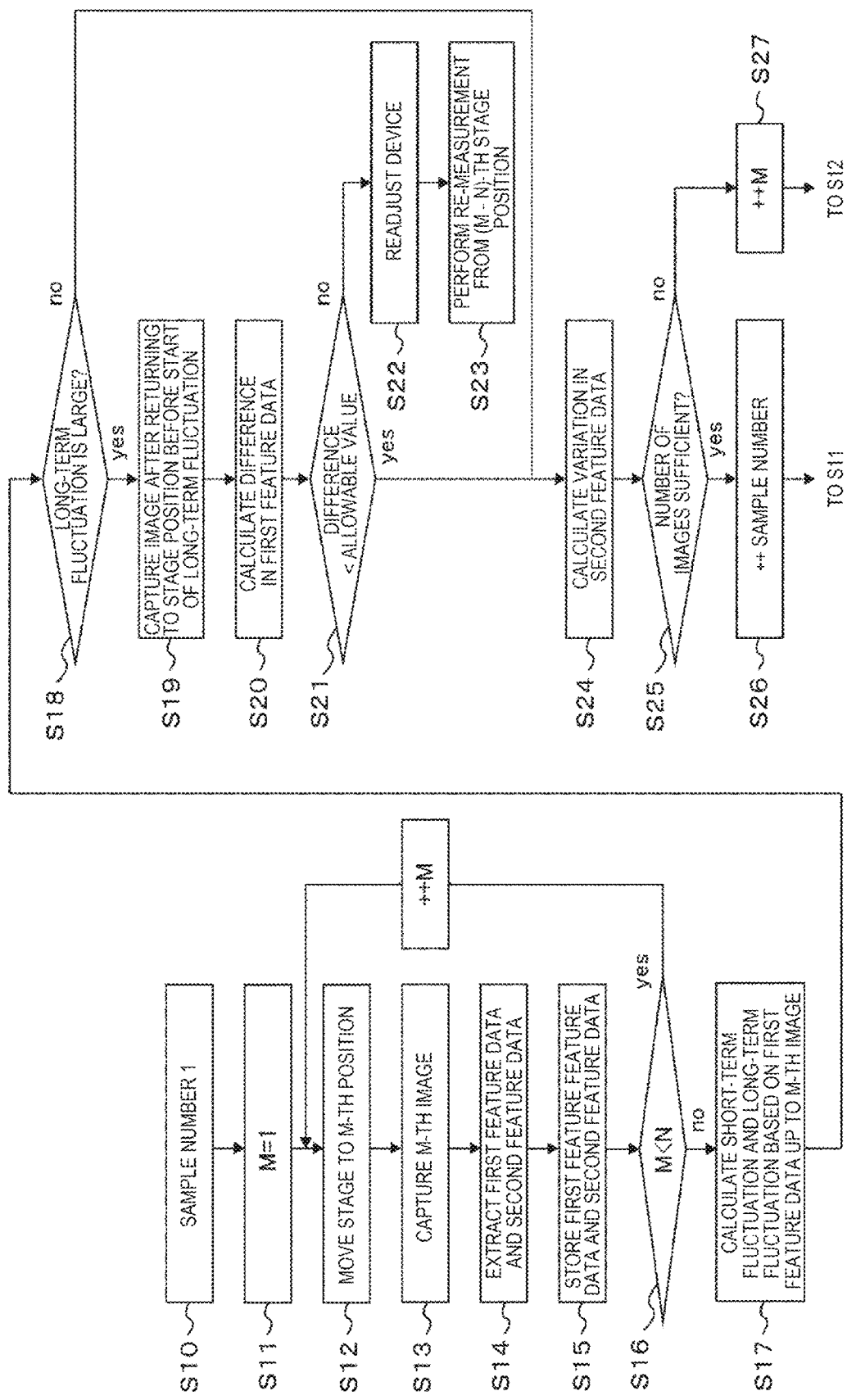

[FIG. 3]
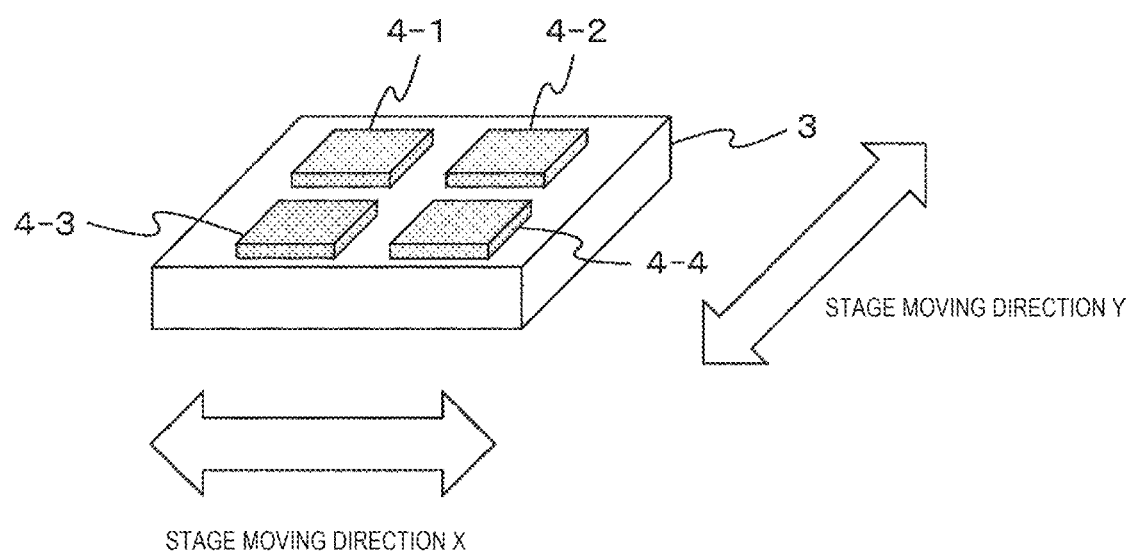

[FIG. 4A]
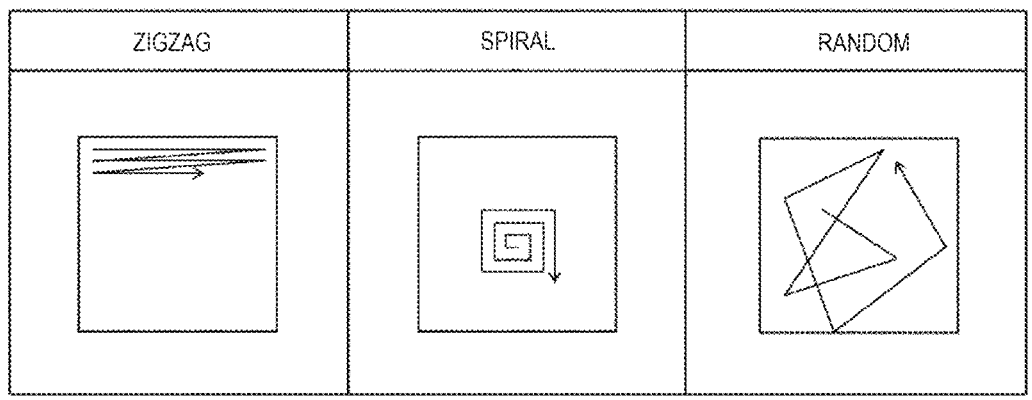
[FIG. 4B]

[FIG. 5A]
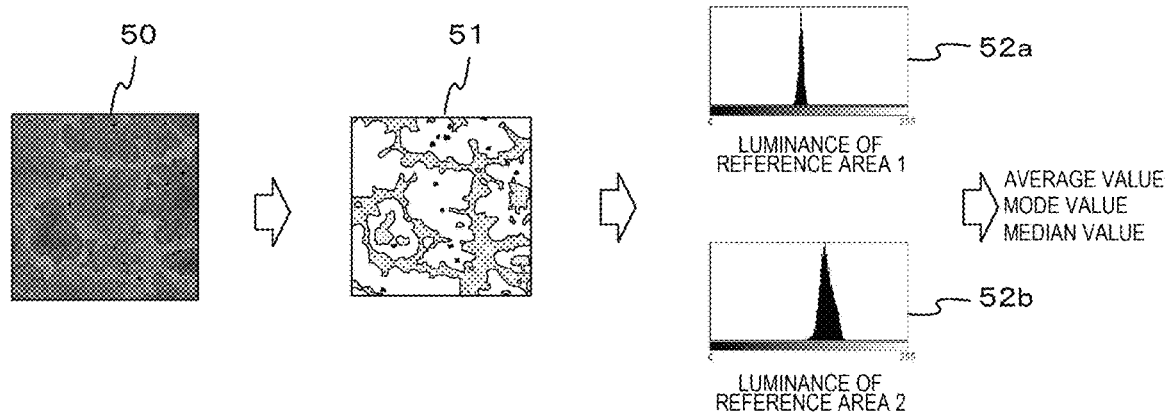
[FIG. 5B]
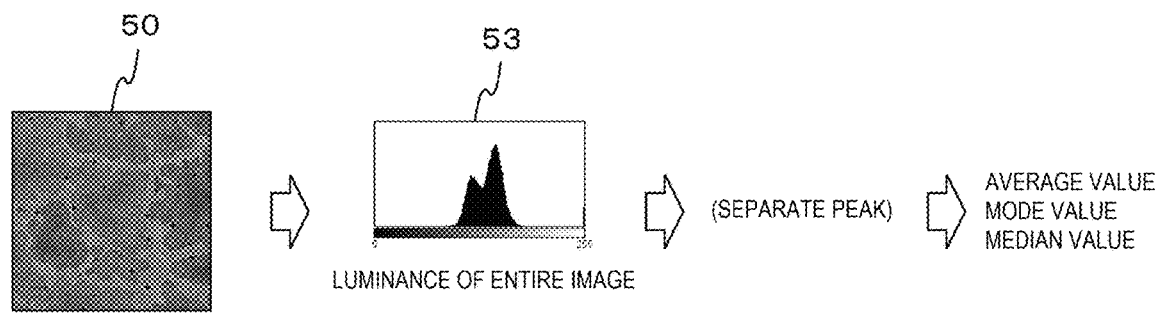

[FIG. 6]
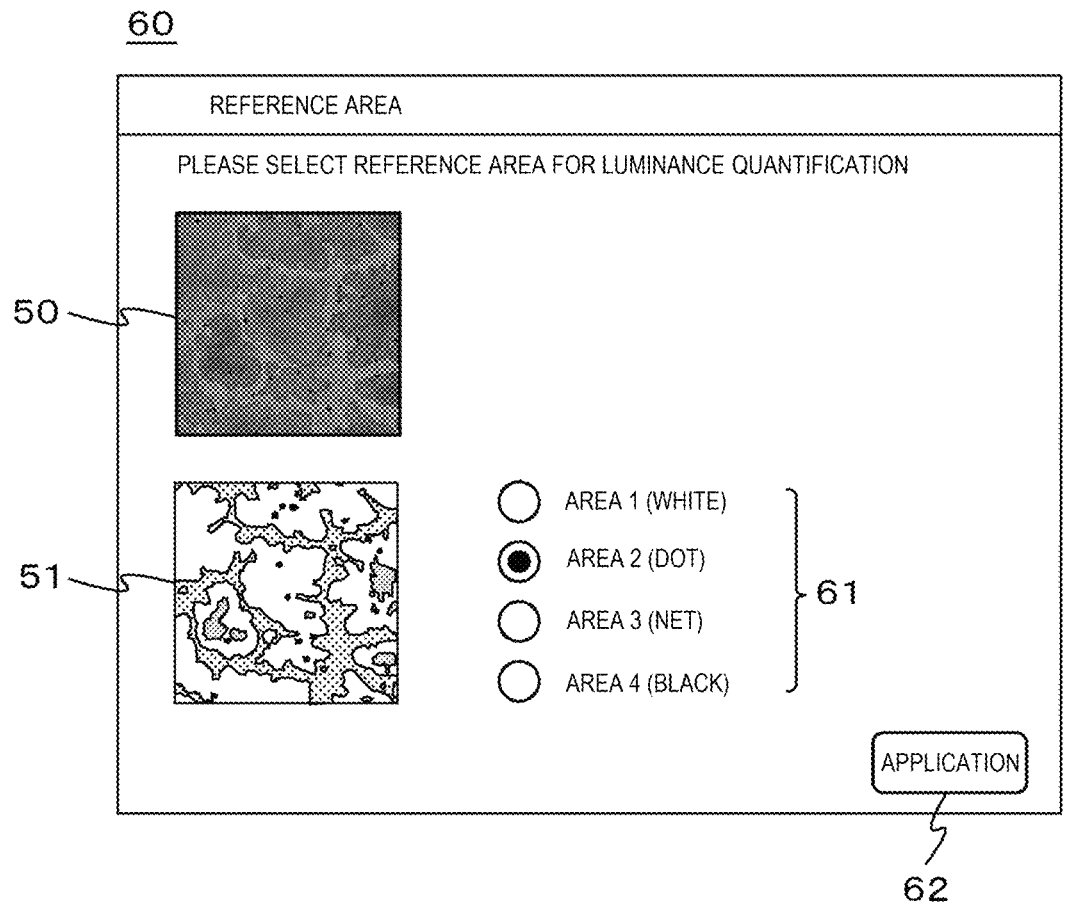
[FIG. 7]
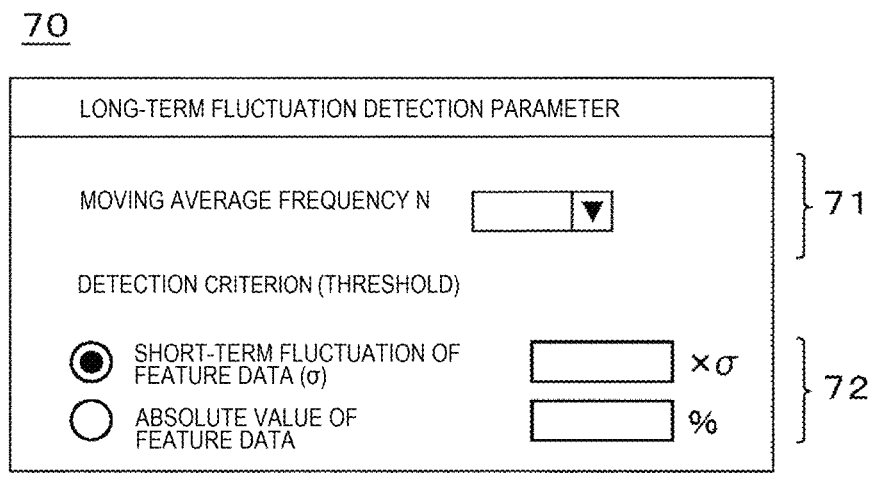

[FIG. 8]
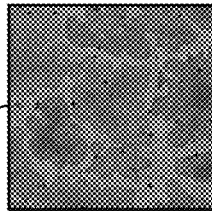
[FIG. 9]
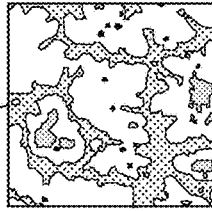

[FIG. 10A]
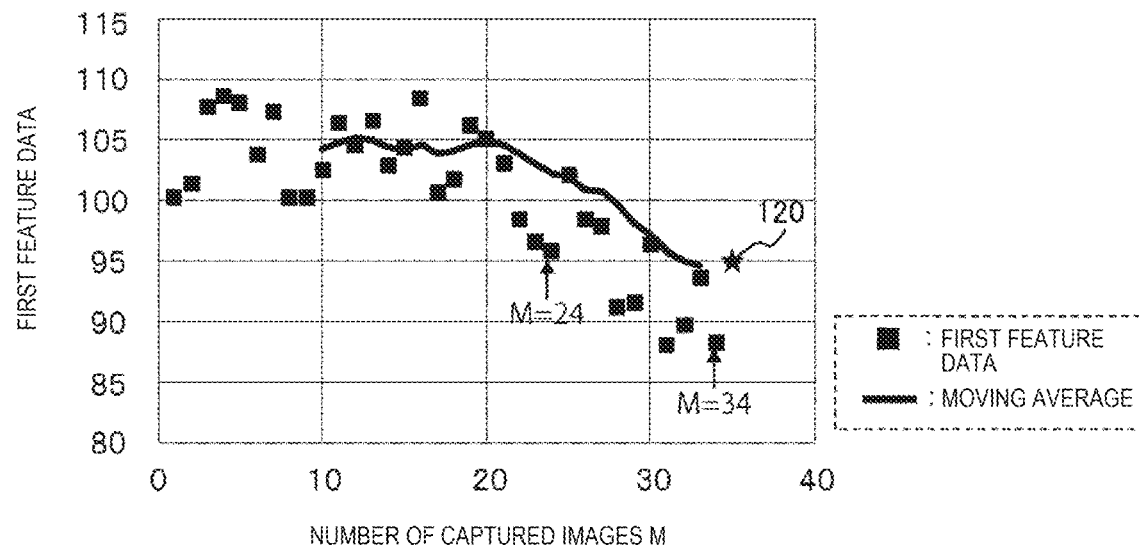
[FIG. 10B]
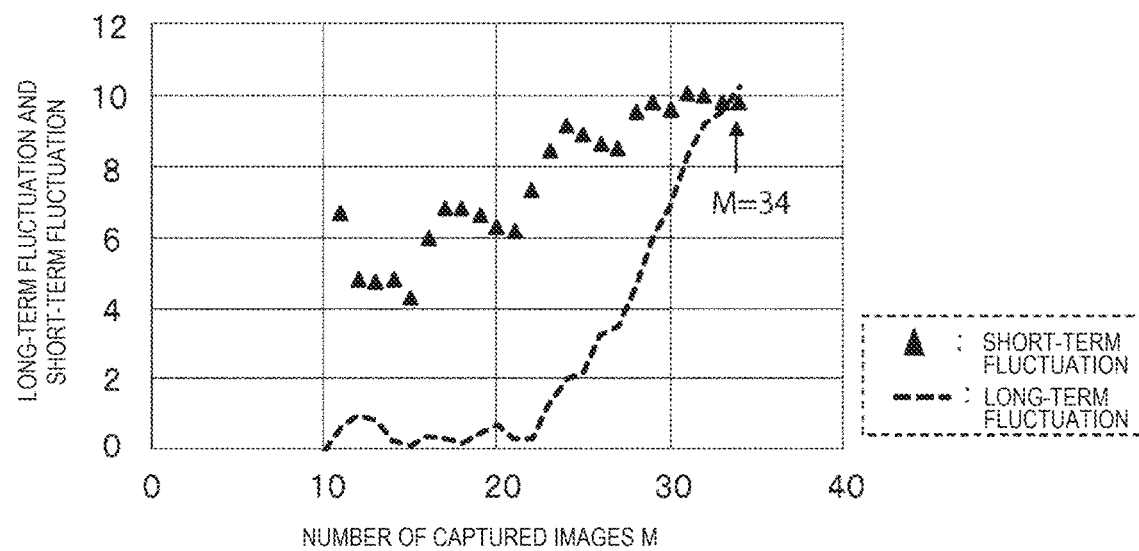

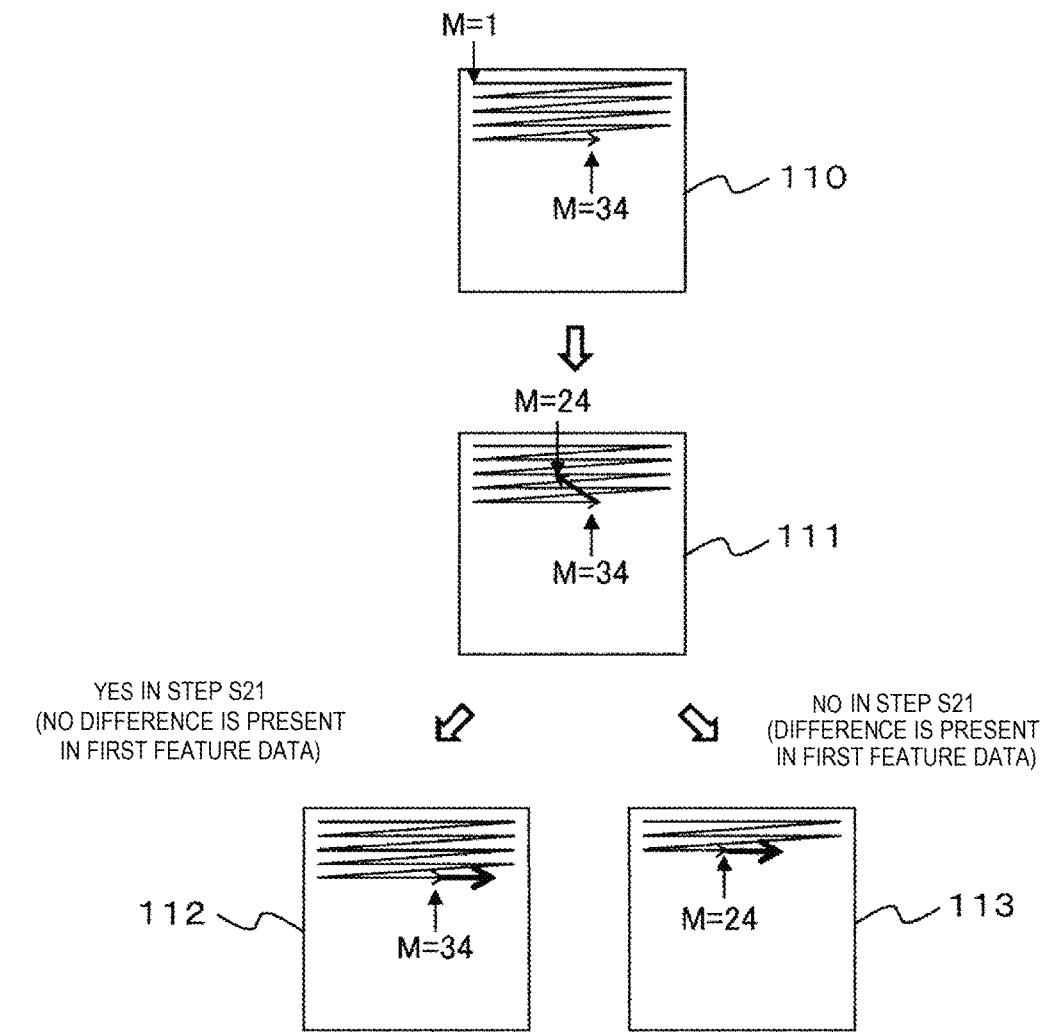

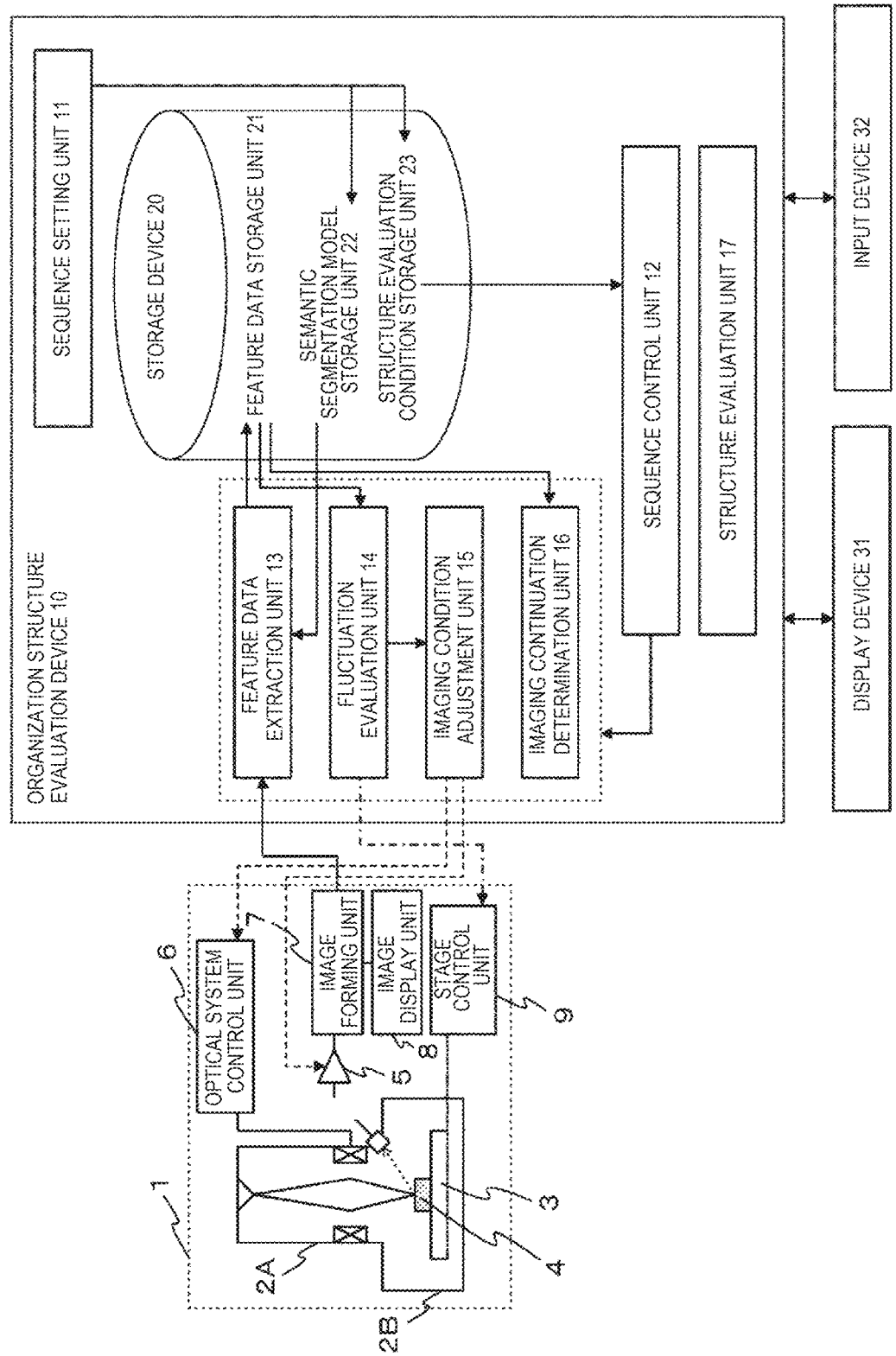
[FIG. 12]

MICROSTRUCTURE EVALUATION SYSTEM AND SAMPLE IMAGE IMAGING METHOD

TECHNICAL FIELD

The present invention relates to a microstructure evaluation system and a sample image imaging method thereof.

BACKGROUND ART

Quantitative and statistical analysis of a micro structure of a highly functional material is effective in development and quality evaluation of the highly functional material. Information on the micro structure of the material can be obtained based on a high-magnification charged particle beam image obtained by an imaging device such as a charged particle beam device. In a microstructure evaluation system, a plurality of samples of the material to be observed are placed on a stage of the imaging device, and these samples are automatically and continuously imaged to acquire a large number of charged particle beam images. Feature data which serves as an indicator of the micro structure is extracted from these charged particle beam images and analyzed.

PTL 1 discloses an image input device that acquires an image of an object to be measured by emitting light and receiving reflected light reflected from the object to be measured, and an image evaluation device. When an amount of light from a light source fluctuates due to deterioration of an illumination light source during imaging, an output from a light receiving element also fluctuates, and image measurement accuracy deteriorates. PTL 1 provides a fluctuation occurrence determination unit that focuses on and detects a short-term and periodic fluctuation in the amount of the light of which a phenomenon is difficult to capture and correction is difficult particularly.

CITATION LIST

Patent Literature

PTL 1: JP2006-262173A

SUMMARY OF INVENTION

Technical Problem

In order to obtain a statistically reliable result, it is necessary to capture a large number of charged particle beam images. For this reason, it may take a long time of a dozen hours to tens of hours until all the images are captured. During this imaging period, a fluctuation in the imaging device such as deterioration in an electron gun or an environmental fluctuation such as a fluctuation in temperature and humidity (such a fluctuation caused by a factor other than a sample which is a subject is collectively referred to as a fluctuation caused by the imaging device) may occur. In this case, in addition to the information on the structure of the material, information on the fluctuation caused by the imaging device is superimposed on the charged particle beam images, and therefore, the information on the structure of the material may not be evaluated correctly.

Further, it is desirable to shorten the imaging period as much as possible from the viewpoint of reducing an analysis cost and avoiding an influence of the fluctuation caused by the imaging device. Therefore, it is desirable to limit the number of captured images of charged particle beam images to a necessary and sufficient number in order to evaluate the information statistically and correctly on the micro structure of the material.

In PTL 1, an image for evaluation is used to detect the occurrence of a fluctuation. To the contrary, the microstructure evaluation system images a sample continuously, and in order to reduce the overhead for fluctuation check, it is desirable that the fluctuation can be detected based on the images of the sample per se.

Solution to Problem

A microstructure evaluation system according to one embodiment of the invention includes: an imaging device including a stage on which a sample is placed, the imaging device being configured to image the sample; and a microstructure evaluation device configured to control the imaging device.

The microstructure evaluation device includes: a feature data extraction unit configured to extract first feature data from an image captured by the imaging device while changing an observation field of view on the sample; and a fluctuation evaluation unit configured to calculate a long-term fluctuation of the first feature data, return an observation field of view to a position before occurrence of the long-term fluctuation and re-capture to acquire a re-captured image when the long-term fluctuation exceeds a predetermined criterion, and calculate a difference between the first feature data of the captured image at the position before the occurrence of the long-term fluctuation and the first feature data of the re-captured image. The fluctuation evaluation unit determines that the long-term fluctuation is a fluctuation caused by the sample when the difference is less than a predetermined threshold, and determines that the long-term fluctuation is a fluctuation caused by the imaging device when the difference is equal to or greater than the predetermined threshold.

Advantageous Effects of Invention

The invention provides a microstructure evaluation system capable of detecting, based on images of a sample, a fluctuation caused by an imaging device.

Other problems and novel features will be apparent from description of the present description and accompanying drawings.

BRIEF DESCRIPTION OF DRAWINGS

FIG. 1 is a condition setting flowchart for continuous imaging.

FIG. 2 is a continuous imaging flowchart.

FIG. 3 is a diagram showing a state in which a plurality of samples are placed on a stage.

FIG. 4A is an example of a sample coordinate registration GUI.

FIG. 4B is a diagram illustrating a trajectory of movement of an observation field of view for each stage movement method.

FIG. 5A is an example of a method for extracting first feature data.

FIG. 5B is another example of the method for extracting first feature data.

FIG. 6 is an example of a reference area setting GUI.

FIG. 7 is an example of a long-term fluctuation detection parameter setting GUI.

FIG. 8 is an example of a microstructure feature data setting GUI.

FIG. 9 is an example of an allowable error setting GUI.

FIG. 10A is a diagram illustrating a transition of the first feature data accompanying continuous imaging.

FIG. 10B is a diagram illustrating transitions of a long-term fluctuation and a short-term fluctuation.

FIG. 11 is a diagram illustrating processing performed by a fluctuation evaluation unit.

FIG. 12 is a functional block diagram of a microstructure evaluation system.

DESCRIPTION OF EMBODIMENTS

FIG. 12 is a functional block diagram showing a microstructure evaluation system according to the present embodiment. An example in which a scanning electron microscope (SEM) is used as an imaging device 1 will be described. The imaging device 1 is not limited to the SEM, and can use a microscope and an analysis device according to feature data to be extracted. An electron optical system and a detection system are built into a microscope body 2A, and a stage 3 on which the sample 4 is placed is built into a sample chamber 2B. At the time of sample observation, an inside of the microscope body 2A and the sample chamber 2B is evacuated by a vacuum pump (not illustrated). The electron optical system includes, as main components, an electron source that emits an electron beam, a condenser lens that focuses the electron beam on a sample, an optical element such as a diaphragm and an objective lens, and a deflector that two-dimensionally scans the electron beam on the sample. The electron optical system is controlled by an optical system control unit 6. A stage control unit 9 controls the stage 3 such that an optical axis of the electron optical system is positioned at a desired position (an observation field of view) on the sample 4. When the electron beam from the electron optical system is emitted to the sample 4, secondary electrons are emitted from the sample 4 due to interaction between the electron beam and the sample. The detection system includes a detector that detects the secondary electrons emitted from the sample 4. A detection signal from the detector is amplified by an amplifier 5, and an image forming unit 7 forms an image (an SEM image) of the sample based on the amplified detection signal. The generated image of the sample is displayed on an image display unit 8.

A microstructure evaluation device 10 is a device that controls the imaging device 1 to image a plurality of samples 4 placed on the stage 3 to acquire a large number of images of the samples, extracts feature data (microstructure feature data) from each image of the sample, and statistically analyzes the feature data to analyze and evaluate a microstructure of a material of each sample. A hardware of the microstructure evaluation device 10 is a computer including a storage device 20 such as a hard disk drive (HDD) or a solid state drive (SSD). In FIG. 12, functions executed by the microstructure evaluation device 10 are expressed in a functional block diagram, and each function is implemented by loading a software program code into a main memory and executing the loaded program code by a processor. Details of each function provided in the microstructure evaluation device 10 will be described later.

The microstructure evaluation device 10 is connected to a display device 31 such as a display 31 and an input device 32 such as a keyboard or a pointing device. A user uses the input device 32 to select and input a graphical user interface (GUI) displayed on the display device 31.

FIG. 1 is a condition setting flow for continuous imaging performed by the microstructure evaluation system. The condition setting flow is performed by a sequence setting unit 11 of the microstructure evaluation device 10. First, the user places, on the stage 3, the plurality of samples 4 of a material to be analyzed (S01). FIG. 3 illustrates a state in which a plurality of samples are placed on a stage. In this example, four samples 4-1 to 4-4 are placed on the stage 3. The stage 3 is configured to be movable in both an X direction and a Y direction. A plane defined by the X direction and the Y direction, which are perpendicular to each other, is perpendicular to the optical axis of the scanning electron microscope of the system, and the stage 3 is moved such that one of the samples 4 is positioned below the optical axis of the electron optical system to capture an image.

Subsequently, coordinates of each sample 4 loaded into the imaging device 1 are registered (S02). A sample coordinate registration GUI 40 to be displayed on the display device 31 by the sequence setting unit 11 in step S02 is illustrated in FIG. 4A. The sample coordinate registration GUI 40 is provided with a coordinate registration unit 41 and a stage movement method selection unit 42. The user registers the coordinates of each sample 4 placed on the stage 3 using the coordinate registration unit 41. In this example, start point coordinates and end point coordinates in the X direction and start point coordinates and end point coordinates in the Y direction are registered for each sample. In the continuous imaging according to the present embodiment, in order to image a plurality of samples while automatically changing the observation field of view with respect to one sample 4, the stage movement method selection unit 42 of the sample coordinate registration GUI 40 designates a movement destination of the observation field of view as a stage movement method. In this example, the user can select a method from three types of methods including a zigzag method, a spiral method, and a random method, and can designate, for the selected method, a movement amount (an interval between the field of views) in the X direction and the Y direction to be moved after imaging. FIG. 4B is a diagram illustrating a trajectory of movement of an observation field of view for each stage movement method. The user selects the stage movement method based on the microstructure of the material, accuracy of an imaging position, the number of captured images, and the like.

Subsequently, a training image is captured from any sample (S03). The training image may include a typical microstructure of the sample, and the imaging position on the sample may be selected as desired. As will be described later, in the continuous imaging according to the present embodiment, whether to continue imaging is determined based on a variation in the microstructure feature data. Therefore, it is necessary to extract the microstructure feature data in parallel with the imaging, and by dividing the captured image into areas according to the microstructure using a trained semantic segmentation model and calculating the feature data from the divided areas, a speed and accuracy of feature data extraction are increased. The semantic segmentation model is a training model that assigns a class to each pixel of an image (in this example, an area according to the microstructure is set as a class).

The user prepares training data in which area divided images obtained by dividing a captured image into areas according to the microstructure of the material are associated with a plurality of training images, and trains the semantic segmentation model (S04). The trained semantic segmentation model is stored in a semantic segmentation model storage unit 22 of the storage device 20.

As will be described later, in the continuous imaging according to the present embodiment, the sample 4 is imaged while ensuring that a fluctuation caused by an imaging device is within a predetermined allowable range. Hereinafter, feature data for grasping the fluctuation caused by the imaging device is referred to as "first feature data". In order to distinguish from this, microstructure feature data for a structural analysis of a sample may be referred to as "second feature data".

FIG. 5A is an example of a method for extracting the first feature data. A method in FIG. 5A is a method that uses an area divided image. Here, an area divided image 51 corresponding to an image 50 is divided into four areas, and the divided areas are displayed in different colors/patterns. The user specifies, from the area divided image 51, one or two areas (referred to as "reference area") to be used to grasp the fluctuation caused by the imaging device. In this example, two reference areas are designated, and the first feature data is calculated based on a luminance distribution 52*a* in a reference area 1 and a luminance distribution 52*b* in a reference area 2.

The first feature data calculated from the designated reference areas may be set in advance by the system or may be set individually by the user. Luminance of the reference area can be used as the first feature data. In this case, a fluctuation in brightness of the reference area or a fluctuation in contrast in the reference area can be used as an indicator of the fluctuation caused by the imaging device. As the feature data representing the luminance distribution in the reference area, an average value, a mode value, a median value, or the like of the luminance distribution can be used.

The method for extracting the first feature data is not limited to the method in FIG. 5A. FIG. 5B is another example of the method for extracting the first feature data. A calculation method in FIG. 5B is a method that does not use an area divided image. In the calculation method in FIG. 5B, a luminance distribution 53 of the entire image 50 is obtained, peaks of the luminance distribution are separated, and the first feature data is calculated. By selecting one or two peaks in order to extract the first feature data from the luminance distribution 53, the first feature data can be extracted as in FIG. 5A.

Sharpness of the image may be used as the first feature data. When the sharpness of the image is used as the first feature data, for example, a repetitive structure in the material is set as the reference area, and a contour length thereof can be extracted as the first feature data. A fluctuation in temperature may cause a shift in a focus adjustment of the imaging device, resulting in blurring of the image of the sample. In such a case, when the contour length of the repetitive structure is calculated as the first feature data, a degree of blurring of the image can be grasped as a change in the contour length. The first feature data may not be of one type, and a plurality of types of first feature data may be extracted to grasp a plurality of fluctuations caused by imaging devices of different causes.

The microstructure evaluation system according to the present embodiment includes a GUI for designating the first feature data and the second feature data using the area divided image 51 of the training image 50.

In order to set the first feature data, the sequence setting unit 11 displays the reference area setting GUI 60 illustrated in FIG. 6 on the display device 31. The training image 50 and the area divided image 51 of the training image 50 are displayed in the reference area setting GUI 60, and the user specifies, by a reference area selection unit 61, a reference area to be used for extracting the first feature data (S05). Here, a state in which an area 2 is specified is illustrated. When an application button 62 is pressed, it is specified that the first feature data is extracted from the area 2. In this case, when the average value of the luminance distribution in the area that is designated as the reference area by the microstructure evaluation system is set to be used as the first feature data, the average value of the luminance distribution in the area corresponding to the area 2 in the captured image is used as the first feature data.

Subsequently, the sequence setting unit 11 displays a long-term fluctuation detection parameter setting GUI 70 illustrated in FIG. 7 on the display device 31 in order to set a condition for determining, based on the first feature data, whether the fluctuation caused by the imaging device is within the allowable range. The long-term fluctuation detection parameter setting GUI 70 includes a long-term fluctuation calculation period setting unit 71 and a detection criterion setting unit 72. In order to grasp the fluctuation caused by the imaging device from the image of the sample, an average (a moving average) of the first feature data of most recent N captured images is used for detecting the fluctuation. The user designates, by the long-term fluctuation calculation period setting unit 71, N captured images for which the moving average is to be taken (306). When a value of N is too small, it is likely to be influenced by a difference in images of the sample; on the other hand, when the value of N is too large, sensitivity to detect the fluctuation caused by the imaging device decreases, and thus it is necessary to set N to an appropriate number.

Next, the user sets, by the detection criterion setting unit 72, a criterion (a threshold) that suggests the occurrence of a fluctuation caused by the imaging device (S07). A reason why it is suggested here is that even if the fluctuation in the first feature data reaches the set criterion, it is possible that the fluctuation is caused by the sample, which is a subject. Therefore, the criterion set here merely suggests the occurrence of the fluctuation caused by the imaging device that exceeds a tolerance, and it is necessary to determine whether the fluctuation caused by the imaging device actually occurs. This determination will be described later.

Two types of criteria can be selected by the detection criterion setting unit 72. In order to determine the cause of the fluctuation, a long-term fluctuation and a short-term fluctuation are defined as indicators of a moving average of the first feature data that can be quantitatively calculated. The long-term fluctuation is defined as a difference between the moving average of the first feature data for the most recent N captured images and a moving average of the first feature data for the most recent N captured images of an N-th captured image (a moving average calculated first in the continuous imaging). The short-term fluctuation is defined as a variation in the first feature data in the captured images with respect to the moving average of the first feature data for the most recent N captured images. For example, when the first feature data is defined as the average value of the luminance distribution in the reference area, the short-term fluctuation can be defined as a variation (a standard deviation) of the luminance of the reference area with respect to the moving average of the first feature data. When the first feature data is defined as an average value of a contour length of the reference area, the short-term fluctuation can be defined as a variation (standard deviation) in the contour length of the reference area with respect to the moving average of the first feature data.

A first criterion suggests the occurrence of the fluctuation caused by the imaging device in accordance with a short-term fluctuation criterion. It can be expected that a magnitude of the short-term fluctuation does not greatly change through an imaging period. Therefore, when the long-term fluctuation changes with exceeding a predetermined ratio with respect to the short-term fluctuation, a probability of occurrence of fluctuation caused by the imaging device is detected.

A second criterion suggests the occurrence of the fluctuation caused by the imaging device in accordance with an absolute value criterion for the long-term fluctuation. When the long-term fluctuation changes with exceeding a predetermined ratio with respect to the moving average of the first feature data for the most recent N captured images of the N-th captured image (that is, the moving average calculated first in the imaging period), the possibility of the occurrence of the fluctuation caused by the imaging device is detected.

Subsequently, the sequence setting unit 11 displays a microstructure feature data setting GUI 80 illustrated in FIG. 8 on the display device 31 in order to set microstructure feature data (the second feature data) which is feature data acquired for a structural analysis of a material of the sample 4. The training image 50 and the area divided image 51 thereof are displayed in the microstructure feature data setting GUI 80, and the user defines the second feature data for the structural analysis of the material of the sample using a feature data selection unit 81 (S08). The feature data selection unit 81 can select an area, a size in a vertical direction, a size in a horizontal direction, the contour length, and the number as feature data that can be extracted for each area in the area divided image 51. These are merely examples, and these feature data may not be selectable, and other feature data may be selectable. After the feature data is selected, when the user presses the application button 82, the feature data of a selected area is set so as to be extracted as the microstructure feature data (the second feature data).

Subsequently, the sequence setting unit 11 displays an allowable error setting GUI 90 illustrated in FIG. 9 on the display device 31 in order to set an allowable confidence interval of microstructure feature data. The user defines an error permitted for quantification of each microstructure feature data specified in step S08 (S09). The error can be designated by a relative value or an absolute value. When the error is designated by the relative value, it is specified quantitatively within how many percentage above or below an average value is allowed, and when the error is designated by the absolute value, it is specified quantitatively within ±how many pixels is allowed, for example.

The sequence setting unit 11 stores, in a structure evaluation condition storage unit 23 of the storage device 20, a condition (a structure evaluation condition) set in the condition setting flow, and condition setting for the continuous imaging is completed. Next, a continuous imaging flow will be described with reference to FIG. 2. The entire continuous imaging flow is controlled by a sequence control unit 12, and in this process, a feature data extraction unit 13, a fluctuation evaluation unit 14, an imaging condition adjustment unit 15, and an imaging continuation determination unit 16 are called and performed.

First, the sequence control unit 12 starts continuous imaging from a sample of sample number 1 (S10). An imaging counter M is set to 1 (S11), and a stage position is moved to a first (M-th) position (S12). The stage position is determined in accordance with the stage movement method set in step S02. A first (M-th) image is captured (S13). The feature data extraction unit 13 divides the captured image into areas by the trained semantic segmentation model, extracts the first feature data set in step S05 and the second feature data set in step S08 (S14), and stores the first feature data and the second feature data in a feature data storage unit 21 (S15). The sequence control unit 12 repeats steps S12 to S15 N times while incrementing the imaging counter M one by one (S16). N is a value set in step S06.

When N captured images are acquired (no in step S16), the fluctuation evaluation unit 14 calculates the short-term fluctuation and the long-term fluctuation based on the first feature data up to the N-th (M-th) image (S17), and determines whether the calculated long-term fluctuation suggests the occurrence of the fluctuation caused by the imaging device based on the criterion set in step S07 (S18). When the long-term fluctuation calculated in step S17 is equal to or less than the criterion in step S07 (no in step S18), the process proceeds to step S24. On the other hand, when the long-term fluctuation exceeds the criterion set in step S07 (yes in step S18), the process proceeds to step S19.

When the long-term fluctuation calculated by the fluctuation evaluation unit 14 in step S17 exceeds the criterion set in step S07, it is necessary to determine whether the long-term fluctuation is due to the fluctuation caused by the imaging device or due to the fluctuation caused by the sample, which is a subject. Therefore, the fluctuation evaluation unit 14 performs the determination in steps S19 to S21. The determination will be described using an example.

In this example, it is assumed that continuous imaging is performed with a moving average frequency N=10, and that a criterion (the first criterion) using the short-term fluctuation in step S07 is set. When the absolute value criterion (the second criterion) for the long-term fluctuation is set in step S07, there is no need to calculate the short-term fluctuation in step S17. FIG. 10A illustrates a transition of the first feature data accompanying continuous imaging, a square in FIG. 10A indicates a value of the first feature data for each imaging, and a solid line indicates the moving average (N=10) of the first feature data. FIG. 10B illustrates transitions of the long-term fluctuation and the short-term fluctuation in this case, a triangle in FIG. 10B indicates a value of a short-term fluctuation for each imaging, and dashed lines indicate the long-term fluctuation (a deviation between a moving average for the number of captured images M and a moving average for the number of captured images N). When the imaging counter M=34, it is determined in step S18 that the long-term fluctuation exceeds the criterion. Processing performed by the fluctuation evaluation unit 14 at this time will be described with reference to FIG. 11. It is assumed that the zigzag method is selected as the stage movement method in step S02.

A trajectory diagram 110 shows a trajectory of an observation field of view when the imaging counter M=1 to 34 on the sample in the example of FIGS. 10A and 10B. As described above, it is assumed that the long-term fluctuation is determined to be large when the imaging counter M=34 (yes in step S18). Therefore, an image is captured after returning to the stage position before the start of the long-term fluctuation (step S19). This state is illustrated in a trajectory diagram 111 in FIG. 11. Here, since the moving average is obtained when the moving average frequency N=10, a position of a stage 3 is controlled such that the stage position before the start of the long-term fluctuation is an observation field of view when the imaging counter M=24. The first feature data is extracted from a re-captured image re-captured in step S19, and is compared with first feature data of a captured image when the imaging counter M=24 (S20).

When there is no fluctuation caused by the imaging device, it is expected that the re-captured image in step S19 re-captured in the same observation field of view and the captured image when the imaging counter M=24 have substantially the same first feature data. Therefore, when a difference between the feature data is smaller than an allowable value, that is, the first feature data is considered to be the same (yes in step S21), it is determined that an abnormality occurring in the long-term fluctuation of the first feature data is a fluctuation caused by the sample, and the continuous imaging is continued as it is. On the other hand, when the difference between the feature data is equal to or larger than the allowable value, that is, the first feature data is considered to be not the same (no in step S21), it is determined that the abnormality occurring in the long-term fluctuation of the first feature data is a fluctuation caused by the imaging device, an imaging condition of the imaging device 1 is readjusted by the imaging condition adjustment unit 15 (S22), and the sequence control unit 12 redo continuous imaging from the stage position before the start of the long-term fluctuation, that is, from the observation field of view when the imaging counter M=24 (S23).

For example, it is assumed that the value of the first feature data of the re-captured image re-captured in step S19 is indicated by a star mark 120 illustrated in FIG. 10A. When it can be considered that no difference is present in feature data, a trajectory of the observation field of view is as illustrated in a trajectory diagram 112 in FIG. 11. When it can be considered that a difference is present in feature data, the trajectory of the observation field of view is as illustrated in a trajectory diagram 113 in FIG. 11.

The imaging condition adjustment unit 15 adjusts the imaging condition of the imaging device 1 according to the first feature data. For example, when the brightness of the reference area is used as an indicator as the first feature data, an offset of the amplifier 5 is adjusted, and when a contrast of the reference area is used as an indicator as the first feature data, a gain of the amplifier 5 is adjusted. When sharpness of the reference area is used as an indicator as the first feature data, a focus of an optical system is adjusted.

Thereafter, the imaging continuation determination unit 16 calculates a variation in the second feature data based on the second feature data of an image of a sample captured up to that time, which is stored in the feature data storage unit 21 (S24), and determines whether the variation in the second feature data satisfies the criterion set in step S09 (S25). When the criterion is satisfied (yes in step S26), the imaging of the sample is ended, and imaging of a next sample is started from the imaging count M=1 (S26). When the sample for which the imaging is ended is a last sample, the imaging ends. On the other hand, when the criterion is not satisfied (no in step S26), 1 is added to the imaging count M (S27), and the imaging is continued.

When the imaging of all samples is ended and microstructure feature data (the second feature data) extracted for all the samples are stored in the feature data storage unit 21, a structure evaluation unit 17 quantitatively and statistically analyzes the micro structure of the material using the obtained microstructure feature data.

The invention has been described above based on the embodiment and the modifications. The invention is not limited to the embodiment and modifications described above, and various modifications are possible without departing from the scope of the invention.

REFERENCE SIGNS LIST

1 imaging device
2A microscope body
2B sample chamber
3 stage
4 sample
5 amplifier
6 optical system control unit
7 image forming unit
8 image display unit
9 stage control unit
10 microstructure evaluation device
11 sequence setting unit
12 sequence control unit
13 feature data extraction unit
14 fluctuation evaluation unit
15 imaging condition adjustment unit
16 imaging continuation determination unit
17 structure evaluation unit
20 storage device
21 feature data storage unit
22 semantic segmentation model storage unit
23 structure evaluation condition storage unit
31 display device
32 input device
40 sample coordinate registration GUI
41 coordinate registration unit
42 stage movement method selection unit
50 image
51 area divided image
52, 53 luminance distribution
60 reference area setting GUI
61 reference area selection unit
62, 82 application button
70 long-term fluctuation detection parameter setting GUI
71 long-term fluctuation calculation period setting unit
72 detection criterion setting unit
80 microstructure feature data setting GUI
81 feature data selection unit
90 allowable error setting GUI
110, 111, 112, 113 trajectory diagram

The invention claimed is:

1. A microstructure evaluation system, comprising:
an imaging microscope configured to image a sample placed on a stage; and
a microstructure evaluation computer configured to control the imaging microscope, wherein
the microstructure evaluation computer is configured to
extract first feature data from an image captured by the imaging microscope while changing an observation field of view on the sample; and
calculate a long-term fluctuation of the first feature data as a difference between a first moving average of the first feature data for a first plurality of captured images and a second moving average of the first feature data for a second plurality of captured images, return an observation field of view to a position before occurrence of the long-term fluctuation and re-capture to acquire a re-captured image when the long-term fluctuation exceeds a predetermined criterion, and calculate a difference between the first feature data of the captured image at the position before the occurrence of the long-term fluctuation and the first feature data of the re-captured image,
wherein the fluctuation evaluation computer determines that the long-term fluctuation is a fluctuation caused by the sample when the difference is less than a predetermined threshold, and determines that the long-term fluctuation is a fluctuation caused by the imaging microscope when the difference is equal to or greater than the predetermined threshold.

2. The microstructure evaluation system according to claim 1, wherein
when the microstructure evaluation computer determines that the long-term fluctuation is the fluctuation caused by the imaging microscope, an imaging condition of the imaging microscope is adjusted, and the captured image at the position before the occurrence of the long-term fluctuation is reacquired by the imaging microscope in which the imaging condition is adjusted.

3. The microstructure evaluation system according to claim 1, wherein
the microstructure evaluation computer divides the captured image into a plurality of areas according to a microstructure of a material of the sample, and
the first feature data is luminance or sharpness of an area which is designated as a reference area among the plurality of areas.

4. The microstructure evaluation system according to claim 3, wherein
the microstructure evaluation computer divides the captured image into the plurality of areas using a trained semantic segmentation model.

5. The microstructure evaluation system according to claim 3, wherein
when the first feature data is the luminance of the reference area, an offset or a gain of an amplifier that amplifies a detection signal of the imaging device is adjusted, or when the first feature data is the sharpness of the reference area, a focus of an optical system of the imaging microscope is adjusted.

6. The microstructure evaluation system according to claim 3, wherein
the microstructure evaluation computer calculates, for each captured image, a moving average of the first feature data of a most recent image from a sequence of captured images, and calculates the long-term fluctuation as a deviation between the moving average of the first feature data of the captured image and a moving average of the first feature data of any one image in the sequence of captured images.

7. The microstructure evaluation system according to claim 6, wherein
the microstructure evaluation computer determines that the long-term fluctuation exceeds the predetermined criterion when the moving average of the first feature data of the captured image is fluctuated with exceeding a predetermined ratio of the moving average of the first feature data of the any one image in the sequence of captured images, and returns the observation field of view from which the latest captured image is acquired to an observation field of view from which the captured image before a number of captured images from the sequence of captured images is acquired so as to re-capture an image.

8. The microstructure evaluation system according to claim 6, wherein
the microstructure evaluation computer calculates, for each captured image, a variation in the first feature data of the captured image with respect to the moving average of the first feature data of the captured image, determines that the long-term fluctuation exceeds the predetermined criterion when the long-term fluctuation is fluctuated with exceeding a predetermined ratio of the variation in the first feature data of the captured image, and returns the observation field of view from which the latest captured image is acquired to an observation field of view from which the captured image before a number of captured images from the sequence of captured images is acquired so as to re-capture an image.

9. The microstructure evaluation system according to claim 1, wherein
the microstructure evaluation computer is further configured to determine whether to continue imaging of the sample,
the microstructure evaluation computer extracts second feature data for a structural analysis of a material of the sample from the image captured by the imaging microscope while changing the observation field of view on the sample, and
when the microstructure evaluation computer determines that the long-term fluctuation is the fluctuation caused by the sample, the microstructure evaluation computer calculates a variation in the second feature data of the captured images captured so far, and ends the imaging of the sample when the variation in the second feature data is equal to or less than a predetermined criterion.

10. The microstructure evaluation system according to claim 9, wherein
a plurality of samples are placed on the stage, and
when the microstructure evaluation computer ends the imaging of the sample, imaging of a sample from the plurality of samples that are placed on the stage and are not imaged yet is started.

11. The microstructure evaluation system according to claim 9, wherein
the microstructure evaluation computer is further configured to perform a structural analysis on a material of the sample using the second feature data.

12. The microstructure evaluation system according to claim 1, wherein
the fluctuation caused by the imaging microscope includes a fluctuation caused by deterioration of a component of the imaging microscope or a fluctuation in an environment in which the imaging microscope is placed.

13. The microstructure evaluation system according to claim 1, wherein
a movement method of the observation field of view on the sample is selectable.

14. A sample image imaging method for a microstructure evaluation system, the microstructure evaluation system including an imaging microscope and a stage on which a sample is placed, the imaging microscope being configured to image the sample; and a microstructure evaluation computer being configured to control the imaging microscope, the sample image imaging method comprising:
imaging by the imaging microscope to acquire a captured image while changing an observation field of view on the sample;
extracting first feature data from the captured image by the microscope evaluation computer;
by the microscope evaluation computer, calculating a long-term fluctuation of the first feature data by determining a difference between a first moving average of the first feature data for a first plurality of captured images and a second moving average of the first feature data for a second plurality of captured images, returning the observation field of view to a position before occurrence of the long-term fluctuation and re-capturing to acquire a re-captured image when the long-term fluctuation exceeds a predetermined criterion, and calculating a difference between the first feature data of the captured image at the position before the occurrence of the long-term fluctuation and the first feature data of the re-captured image;

determining, by the microscope evaluation computer, that the long-term fluctuation is a fluctuation caused by the imaging microscope when the difference is equal to or greater than a predetermined threshold; and reacquiring the captured image from the position before the occurrence of the long-term fluctuation by the imaging microscope in which an imaging condition is adjusted.

15. The sample image imaging method according to claim 14, wherein the microstructure evaluation computer is further configured to extract second feature data for a structural analysis of a material of the sample from the captured image, determine that the long-term fluctuation is a fluctuation caused by the sample when the difference is less than the predetermined threshold, and calculate a variation in the second feature data of a plurality of samples, and ends the imaging of the sample when the variation in the second feature data is equal to or less than a predetermined criterion.

* * * * *